(No Model.) 2 Sheets—Sheet 1.

I. FLOHRE & C. PERRIN.
COMBINED CLOD CRUSHER AND HARROW.

No. 362,071. Patented May 3, 1887.

WITNESSES
Phil C. Dietrich
Rex. Smith

INVENTOR
Israel Flohre
Chas Perrin
by A. M. Smith
Attorney

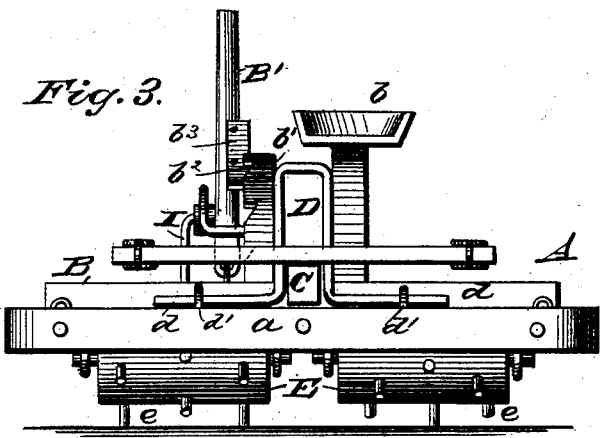
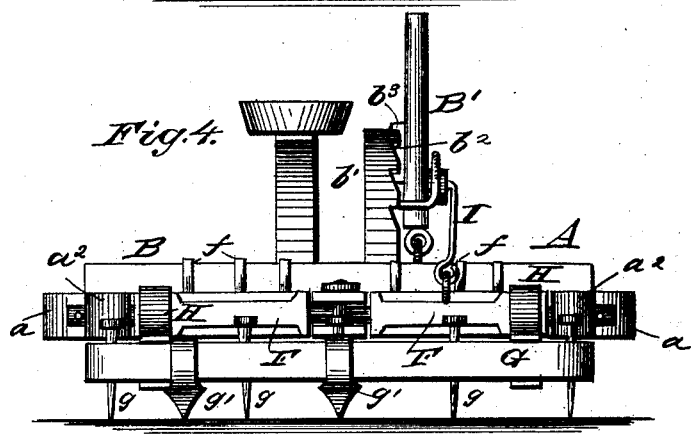
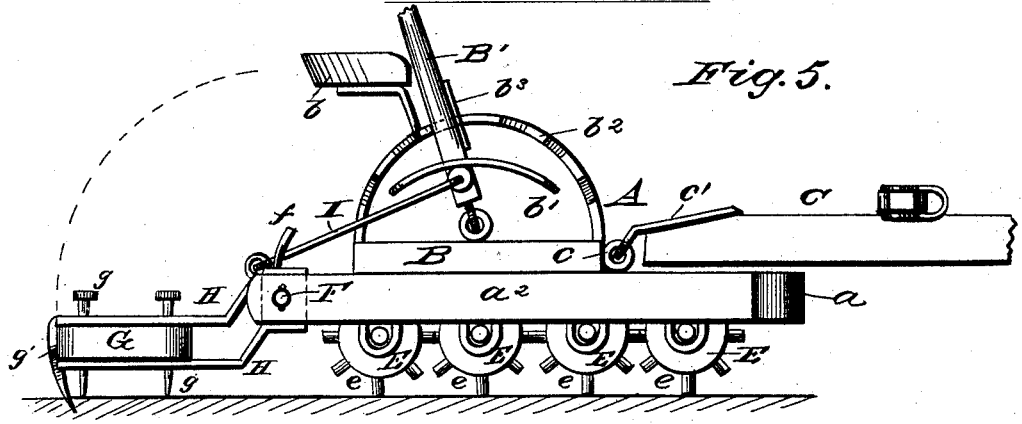

UNITED STATES PATENT OFFICE.

ISRAEL FLOHRE AND CHARLES PERRIN, OF SPRINGFIELD, OHIO.

COMBINED CLOD-CRUSHER AND HARROW.

SPECIFICATION forming part of Letters Patent No. 362,071, dated May 3, 1887.

Application filed August 5, 1886. Serial No. 210,094. (No model.)

*To all whom it may concern:*

Be it known that we, ISRAEL FLOHRE and CHARLES PERRIN, both of Springfield, county of Clark, and State of Ohio, have invented a new and useful Improvement in Combined Clod-Crushers and Harrows, of which the following is a full, clear, and exact description, reference being had to the accompanying drawings, making part of this specification.

Our invention relates to agricultural implements for breaking up lumpy soil and pulverizing the same; and the objects of our invention are, first, to provide a clod-crusher with an attachment for clearing the rollers or crushers of rubbish, and also for connecting and carrying the harrow.

A further object of our invention is to so connect the draft-tongue to the roller or crusher frame that said frame shall always run entirely upon the ground.

To the above purposes our invention consists, first, in a rocking bar journaled in the rear end of the roller or crusher frame and carrying a harrow or drag frame, said bar being also provided with teeth for clearing rubbish from the rear set of crushers or rollers.

Our invention further consists in a draft-tongue connected pivotally to the roller-frame and a guide or frame for insuring the proper play of the tongue while the machine is being drawn over the ground.

Our invention finally consists in certain peculiar and novel features of construction and arrangement relating to the lever for adjusting the harrow, and also means for marking furrows for seed, all as hereinafter described and claimed.

In order that our invention may be fully understood, we will proceed to describe it with reference to the accompanying drawings, in which—

Figure 1:
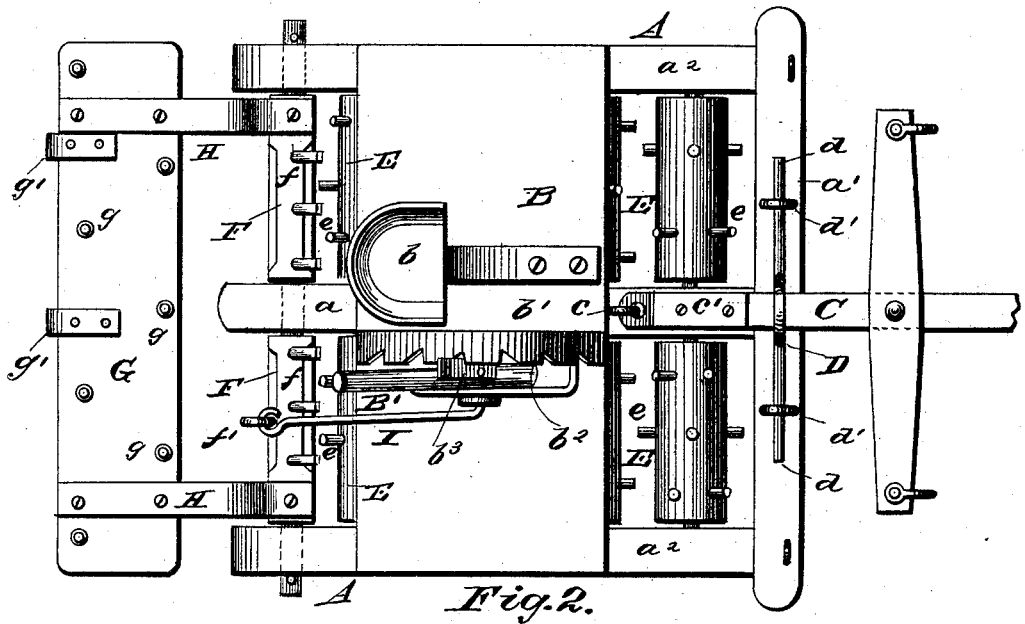
Figure 2:
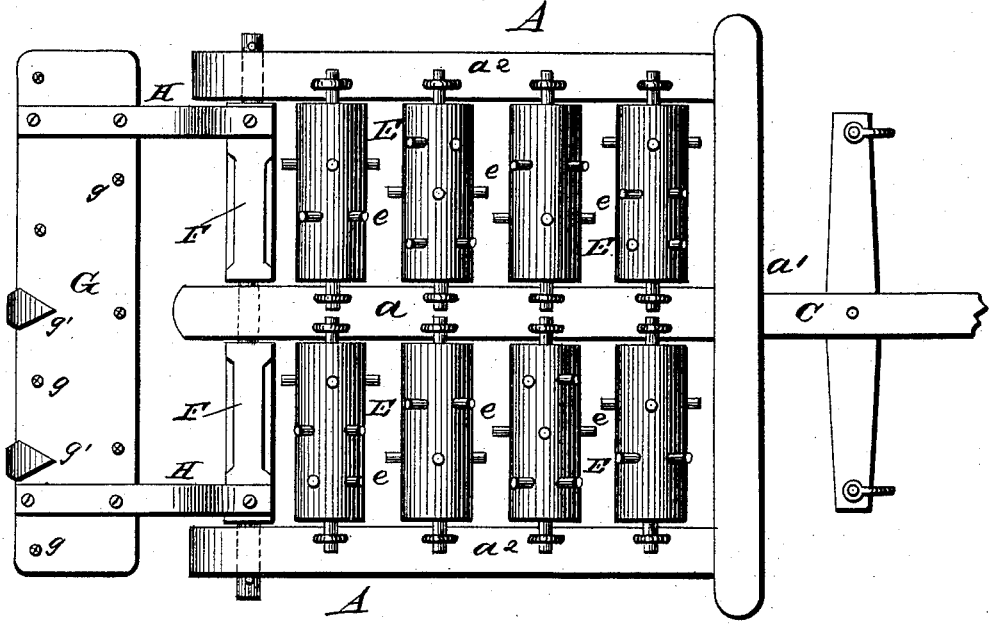

Figure 1 is a plan view of our improved machine. Fig. 2 is an inverted plan view of the same. Fig. 3 is a front end elevation, Fig. 4 a rear end elevation, and Fig. 5 a side elevation, of the same.

In the said drawings, A designates a rectangular frame, having a central beam, $a$, extending from the front cross-beam, $a'$, to the rear of the machine and parallel with the side beams, $a^2$. Upon the upper sides of these beams $a'$ $a^2$ is placed a platform, B, which extends across the frame A, and upon which is mounted the driver's seat $b$, and to the right side of said seat a semi-annular frame, $b'$, which carries a segmental rack, $b^2$. A hand-lever, B', is pivoted upon the platform B beside the frame $b'$, and carries an edged plate, $b^3$, to engage the rack $b^2$. Upon the upper side of the central beam, $a$, is secured a staple, $c$, which is located just in front of the platform B, and to which the rear end of the tongue C is loosely attached by a plate, $c'$, so as to permit the free upward and downward movement of the tongue. An inverted-U-shaped rod, D, is secured to the upper side of the cross-beam $a'$ by staples $d'$, which are driven into the beam and embrace the outwardly-extending ends $d$ of the rod D. This rod straddles the rear end of the tongue C and extends well above it, so as to serve as a frame or guide to confine the tongue against lateral movement, and to limit the upward movement of the tongue. Thus the frame A will at all times run freely upon the ground independently of the varying positions of the tongue C.

E E designate two sets of rolls—four being shown in each set—which are journaled at their ends in the side pieces, $a^2$, and at their opposite ends in the central beam, $a$. Upon the peripheries of these rolls are placed radially-extending teeth $e$, so arranged that those on one roll shall alternate with those upon the next succeeding roll.

F designates a rock-bar, which is journaled at its ends in the rear ends of the side beams, $a^2$, and passes freely through the rear end of the central beam, $a$. Upon its upper side, at each side of the central beam, $a$, this rock-bar is formed with a series of teeth, $f$, for a purpose to be hereinafter explained.

G designates the harrow-frame, which is shown as of oblong rectangular form, and which is connected to the rock-bar F by four metal bars, H, the forward ends of which are secured to the upper and lower sides of the rock-bar F, and at their rear ends to the upper and lower sides of the harrow-frame. This frame is pierced through by a series of downwardly-extending harrow-teeth, $g$, as shown. Upon the rear edge of the harrow-frame G are secured three or more marking-shovels, *g'*, which serve to open furrows for a seed-planter.

The hand-lever B is connected to the upper side of the rock-bar F by the link I, the forward end of which is pivoted to the side of said hand-lever, above the lower end thereof, the rear end of said link being bent to embrace a loop, *f'*, upon the upper side of rock-bar F.

From the above-described construction it will be seen that the roller or crusher will always run entirely upon the ground, the bent rod D permitting the free rise and fall of said frame, and insuring the ready turning thereof by confining the tongue against lateral movement.

It will be further seen that all rubbish will pass successively from the teeth of the front pair of rollers to the rear pair of the same, and that when the hand-lever B is pushed forward the harrow-frame will be raised by the rotation of the rock-bar, and at the same time the teeth *f* upon said bar will engage the teeth of the rear set of rolls and remove all rubbish therefrom.

Having now described our invention, what we claim as new, and desire to secure by Letters Patent, is—

1. A crusher or roller frame upheld by the two series of toothed crushing-rollers and provided with the pivoted tongue, as described, in combination with a harrow-frame hinged to the roller-frame through a rock-shaft having clearing-teeth, which, when the harrow is rocked upward to free it from obstructing matter, will be rocked downward into position to act as clearers for freeing the rear crushing-rollers from obstructing material, substantially as described.

2. In a combined crusher and harrow, the combination of the main or roller frame having the central longitudinal frame-bar, the two series of crushing and grubbing rollers, arranged one set on either side of said central bar and upholding the frame, the hinged tongue, the harrow-frame hinged to said roller-frame, the interposed rock-shaft forming the pivot for the harrow-frame and having clearing-teeth, which, as the harrow is lifted, are rocked downward to act upon the rear rollers, and means, substantially as described, for raising the harrow-teeth and simultaneously depressing the clearing-teeth, and for holding the same at the desired adjustment, substantially as and for the purpose described.

In testimony whereof we have hereunto set our hands this 31st day of July, A. D. 1886.

ISRAEL FLOHRE.
CHARLES PERRIN.

Witnesses:
P. J. CLEVENGER,
J. G. KENNAN.